United States Patent [19]

Kansupada

[11] Patent Number: 4,967,819

[45] Date of Patent: Nov. 6, 1990

[54] COATING COMPOSITION AND TIRE COATED THEREWITH

[75] Inventor: Bharat K. Kansupada, Mogodore, Ohio

[73] Assignee: The Goodyear Tire & Rubber Company, Akron, Ohio

[21] Appl. No.: 322,832

[22] Filed: Mar. 13, 1989

[51] Int. Cl.$^5$ .............................................. B60C 13/00
[52] U.S. Cl. ..................... 152/524; 156/116; 524/386; 524/387; 524/388; 524/430; 524/437; 524/557
[58] Field of Search ............... 524/386, 387, 388, 430, 524/437, 557; 525/56; 152/524; 156/116

[56] References Cited

U.S. PATENT DOCUMENTS

| | | | |
|---|---|---|---|
| 2,015,234 | 9/1935 | Rodman | 524/388 |
| 2,399,456 | 4/1946 | Yates et al. | 524/388 X |
| 3,114,650 | 12/1963 | Oppenheim et al. | 524/388 X |
| 3,865,774 | 2/1975 | Malone | 524/557 |
| 4,101,494 | 7/1978 | Kent et al. | 524/388 |
| 4,469,837 | 9/1984 | Cattaneo | 524/557 |

*Primary Examiner*—Joseph L. Schofer
*Assistant Examiner*—J. M. Reddick
*Attorney, Agent, or Firm*—Henry C. Young, Jr.

[57] ABSTRACT

A pneumatic tire having a coating on at least one of its surfaces comprised of (a) polyvinyl-alcohol coating material containing (B) aluminum hydroxide.

2 Claims, No Drawings

COATING COMPOSITION AND TIRE COATED THEREWITH

FIELD

This invention relates to a coating composition for various substrates and to a substrate coated with such composition. More particularly, it relates to a coating composition for a cured rubber substrate and to such a coated cured rubber substrate. More specifically, the invention relates to a protective coating composition for a rubber tire sidewall and a tire having a sidewall with such coating thereon.

BACKGROUND

Tire sidewalls are often coated with protective paints or coatings, particularly tire sidewalls having a color which contrasts with the typical black colored remainder of the tire. The general purpose of such a protective coat or painting is to inhibit or prevent migration of chemicals to the tire rubber composition from the surface of an adjacent black colored tire which would otherwise tend to stain and thus, discolor the rubber. The staining usually becomes evident after exposure of the contacted rubber surface to ultra-violet light such as sunlight. Such contact staining phenomenon is well known.

Rubber tires are typically black in color due to the carbon black reinforcement contained therein. If a contrasting or other color is desired for a part of the tire, then a coloring pigment is used rather than the carbon black. Conventionally, various of the compounding ingredients used in the formulation of rubber for the manufacture of rubber products such as tires are of the staining type, namely, amine based antidegradants and aromatic rubber processing oils. The materials tend to migrate to the surface of the rubber and may stain or discolor a rubber surface of another rubber article which may come in contact with it for a period of time, particularly after the contacted rubber is then exposed to ultra-violet light.

Often, a polyvinylalcohol (PVA) based coating is used to protect such contrastingly colored rubber surfaces from other rubber surfaces of the staining type because the polyvinylalcohol itself tends to be a barrier for the migration of such staining material. Moreover, the PVA can normally be easily removed from the coated rubber surface, when and if desired, by simple water washing, usually with a soap solution, since the PVA itself normally has a relatively high degree of water solubility, particularly when the water contains a surfactant. Thus, the PVA coat has a primary use for storage and shipping of the tires. It may easily be removed by the user by water washing.

PVA is normally used in conjunction with (mixed with) a plasticizer therefor so that the resulting PVA-based coating has a degree of flexibility. Such PVA mixture is referred to herein as PVA coating.

Tires are often stored under varying circumstances for various purposes so that they may be in contact with each other for a period of time such as, for example, storage during their shipping or transportation to various locations and warehouse storing. The storage conditions can vary considerably and, sometimes, the tires are stored under relatively high humidity conditions.

Under such circumstances, where the tire surface has a PVA-based coating thereon, it has been observed that under relatively high humidity conditions the PVA based coating softens and relatively easily scuffs or abrades away, particularly as one tire may rub against another during shipment, thereby leaving a portion of the contrastingly colored sidewall unprotected and susceptible to chemical contact migrating staining from other adjacent and contacting rubber products, including tires.

Accordingly, it is desired to provide a coating composition and a resultant coated rubber product, particularly a coated tire sidewall rubber surface, which will retard, inhibit and/or prevent the migration of amine based antidegradants and aromatic processing oils onto the rubber sidewall surface, such as a white sidewall, from an adjacent and contacting black rubber surface.

DISCLOSURE AND PRACTICE OF THE INVENTION

In accordance with this invention, a composition is comprised of (A) 100 parts by weight polyvinylalcohol (PVA) coating, and (B) about 10 to about 65, preferably about 30 to about 50, parts by weight of at least one of aluminum hydroxide and aluminum oxide based on the PVA (the PVA resin itself.

Generally it is preferred that the particulate material is aluminum hydroxide or mixtures of aluminum hydroxide and aluminum oxide.

In the practice of this invention, it is understood that the PVA coating includes a suitable plasticizer therefor, such as for example, glycerin and/or polyglycerol to make the PVA coating more flexible. While the choice of plasticizers may not be entirely critical, it should be a plasticizer which does not substantially degrade the resistance of the PVA to the migration of the aforesaid staining materials. Typically the PVA coating is comprised of 100 parts by weight PVA and about 10 to about 20 or even up to about 30 parts by weight plasticizer. Such coating composition is relatively well known to those skilled in such art.

As hereinbefore referenced, various ingredients are conventionally used in the compounding of rubber for the manufacture of rubber articles, including tires, which are well known to those having skill in such art such as the various antidegradants, processing oils and the like.

While the mechanism may not be entirely and completely understood, it is believed that the said aluminum hydroxide and/or aluminum oxide may somewhat crosslink the PVA through its hydroxyl groups. As a result, the hydrophobic nature of the coating is enhanced. In addition, or in the alternative, the aluminum hydroxide and/or aluminum oxide may act directly to reduce the overall hydrophilic property of the coating.

Thus, there is a particular benefit in utilizing the coating composition for coating at least a portion of the sidewall of a rubber tire, particularly a pneumatic rubber tire, and has been observed to provide a more durable PVA based coating in a humid environment under scuffing or abrading conditions.

Thus, in accordance with this invention, a rubber tire is provided having at least one surface coated with the composition of this invention.

In further accordance with this invention, a pneumatic tire is provided composed of cured rubber of which a portion of said cured rubber contains at least one pigment loading selected from particulate titanium dioxide and zinc oxide in the absence of carbon black wherein said portion has a coating of the composition of this invention thereon.

The polyvinylalcohol can generally be described as being about an 80 to 99.5 percent hydrolyzed polyvinylacetate. Thus the PVA, as it would be understood by those having skill in the art, contains a small amount of polyvinyl acetate. It usually has a number average molecular weight in the range of about 2,000 to about 50,000 and a molecular weight average in the range of about 84,000 to about 110,000, although these values are not considered critical but are desirable. Those having skill in such art recognize such description of a PVA.

The advantages of this invention are more particularly shown by the following example in which the parts and percentages are by weight unless otherwise indicated.

EXAMPLE I

Sulfur cured rubber samples were obtained having the dimensions of about 2 inches by 2 inches with a thickness of about ⅛ inch.

Both samples contained a particulate titanium dioxide white coloring pigment without carbon black reinforcement and thus were white in color.

Water based coating compositions were prepared of polyvinylalcohol coating material (Control Coating A) and as a mixture of polyvinylalcohol coating material and particulate aluminum hydroxide (Experimental Coating B).

The water based coating compositions (A and B) were individually and separately coated onto the white cured rubber samples and allowed to dry in a circulating hot air oven at a temperature of about 120° to 140° C. The dried, coated white rubber samples were placed in a humidity chamber at a temperature of about 30° C and 85% to 95% relative humidity. The samples were removed therefrom after a period of about one hour.

A sulfur cured, carbon black containing rubber was obtained as a tire tread cross-section and was rubbed by hand against the coated, cured white rubber samples (A) and (B) immediately after their removal from the humidity chamber.

The rubbed samples were observed and given a rating of a number of from 1 to 5 corresponding to the number of "rubs" it took to scuff or abrade away a portion of the coating to expose the white, uncoated, sample surface. A rating of 1 (one rub) would represent a poor adhesion of the high humidity exposed coating to the cured white-colored rubber sample and, a rating of 5 (five rubs) represented a relatively good adhesion of the coating.

The coated control sample (A) was rated with a number 1 value whereas the coated sample (B) containing the polyvinylalcohol coating with the aluminum hydroxide contained therein had an observed 3 to 5 rating.

For illustrative purposes, the coating composition (B) was comprised a mixture of Solution No. 1 and Solution No. 2 as shown in Table 1. Coating composition (A), as a control, was Solution No. 2 shown in Table 1.

TABLE 1

| Solution No. 1 | |
|---|---|
| Water | 48 parts |
| Aluminum sulfate[1] | 42 parts |
| Potassium hydroxide[1] | 12 parts |
| Solution No. 2 | |
| Solution No. 1 | 23 parts |
| Polyvinylalcohol Coating[2] | 100 parts |

[1]The aluminum sulfate and potassium hydroxide combined to form the aluminum hydroxide.
[2]The PVA coating material was comprised of 68 parts water, 20-25 parts PVA and the remainder primarily water miscible plasticizer.

What is claimed is:

1. A pneumatic tire composed of cured rubber of which a portion of said cured rubber contains at least one pigment loading selected from particulate titanium dioxide and zinc oxide in the absence of carbon black where a surface of said portion has a coating thereon of a composition comprised of (A) 100 parts by weight polyvinylalcohol (PVA) coating material containing (B) about 10 to about 65 parts by weight aluminum hydroxide based on the PVA resin itself.

2. The tire of claim 1 where the PVA coating material of said composition is comprised of 100 parts PVA and about 10 to about 30 parts by weight of a plasticizer comprised of at least one of glycerin and polyglycerol.

* * * * *